Dec. 6, 1966 — W. J. HALEY — 3,289,431
REFRIGERATION SYSTEM CAPACITY CONTROL WITH PILOT
OPERATED REGULATING VALVE
Filed June 4, 1964

Inventor
William J. Haley
By: Thomas B. Hunter, Atty

Fig.2

Inventor:
William J. Haley
By: Thomas B. Hunter Atty

United States Patent Office 3,289,431
Patented Dec. 6, 1966

3,289,431
REFRIGERATION SYSTEM CAPACITY CONTROL WITH PILOT OPERATED REGULATING VALVE
William J. Haley, Muncie, Ind., assignor to Borg-Warner Corporation, a corporation of Illinois
Filed June 4, 1964, Ser. No. 372,614
4 Claims. (Cl. 62—217)

This invention relates to refrigeration systems and more particularly to an improved capacity control means for compressors.

There are several known techniques for controlling the capacity of a refrigeration system. Among the more commonly used arrangements are high or low side valves and means for unloading the compressor. The present invention uses a valve on the suction side of the compressor for throttling the flow of refrigerant to the compressor when low capacity is desired.

The primary objectives in the design of capacity control mechanisms are simplification of construction, reduction of cost, and promoting reliability of operation. In automotive type air-conditioning systems for which the present control system is especially adapted, the aforementioned design criteria are particularly important since such systems are used in an environment which is hostile to dependable operation. Temperature extremes, dust, shock, and other factors are not conducive to trouble-free service.

The present invention uses the concept of an evaporator pressure control valve which is incorporated into the compressor housing. A control pressure, supplied by engine vacuum, is under the control of the operator and is communicated to a pilot valve also located within the compressor housing. This arrangement avoids the necessity of using such mechanical devices as Bowden wires, etc., for changing the capacity setting.

It is therefore a principal object of the invention to provide an improved capacity control system especially adapted for use in an automotive-type air-conditioning system.

Another object of the invention is to provide an improved capacity control system which is sensitive to changes in cooling requirements.

Another object of the invention is to provide a capacity control system of the type which includes a throttling valve on the suction side of the compressor, said suction valve being completely integrated into the compressor housing.

Additional objects and advantages will be apparent from a reading of the following detailed description taken in conjunction with the drawings wherein:

FIGURE 2 is a cross-sectional view of a compressor having the capacity control system of the present invention incorporated therein;

Figure 1:
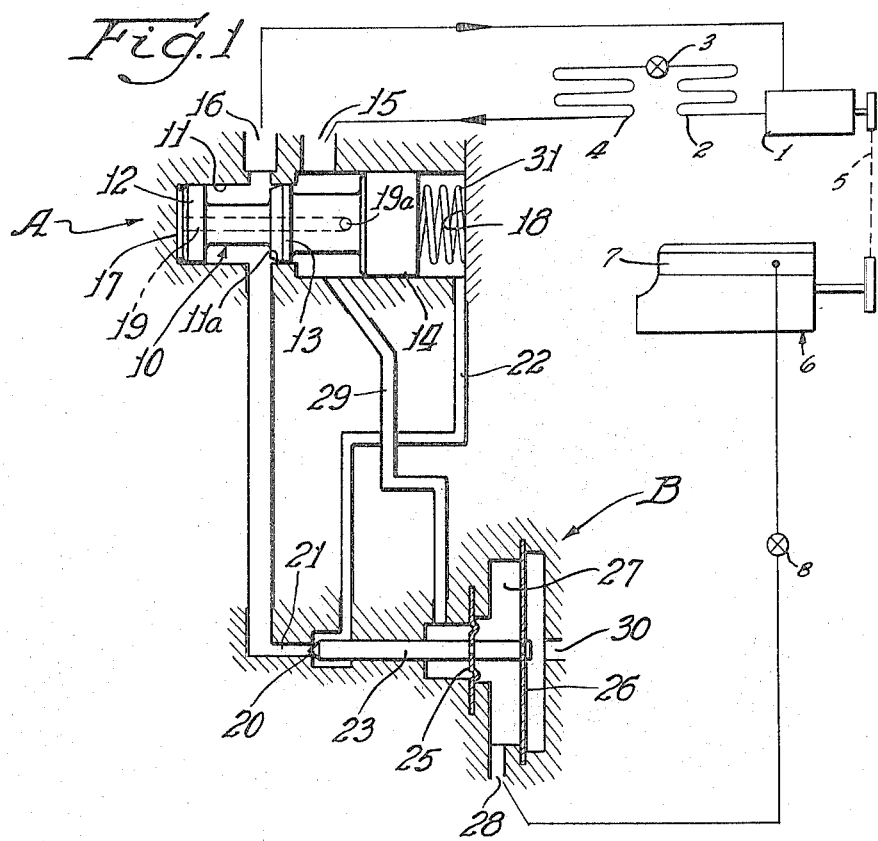
FIGURE 1 is a schematic or diagrammatic representation of a control system embodying the principles of the present invention.
Figure 5:
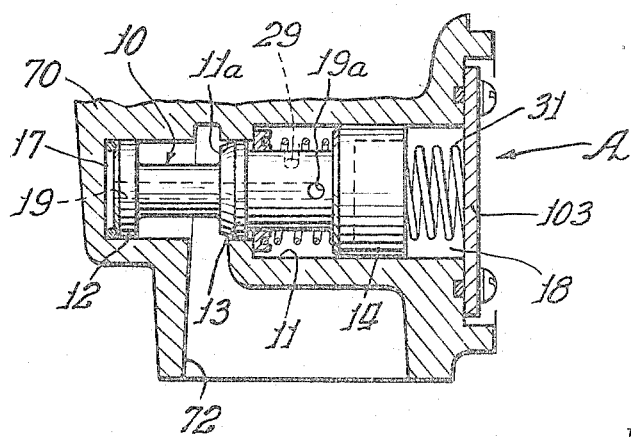
FIGURE 5 is a cross-sectional view taken along the plane of line 5—5 of FIGURE 4.

Referring now to the drawings, and more particularly to FIGURE 1, the air conditioning system and the associated capacity control components are illustrated in schematic form. The refrigeration circuit includes a compressor 1 supplying high pressure refrigerant gas to a condenser 2, a capillary or expansion valve 3, and an evaporator 4. Since the refrigerant circuit is especially adapted for use in an automotive air conditioning system, it is conventional to drive the compressor by means of a power takeoff 5 from the automobile engine 6, said engine having an intake manifold 7 which is adapted to provide a vacuum source for the capacity control through an adjustable constant pressure valve 8.

The capacity control system includes a main regulating valve assembly A through which low pressure refrigerant passes from the evaporator 4 to the suction side of the compressor 1. This valve assembly, hereinafter referred to as the main regulating valve, is under the control of a second valve B, referred to as the pilot valve, which is actuated in response to both evaporator pressure (which is indicative of the load) and an adjustable control vacuum which can be set to satisfy the comfort requirements of the automobile's occupants. As mentioned above, a convenient source of vacuum in an automotive system is the intake manifold 7 which is connected to the pilot valve B through an adjustable constant pressure regulating valve 8.

The capacity regulating valve A comprises a valve member 10 slidably received within a cylindrical cavity 11. The valve member includes a plurality of spools 12, 13, and 14 including an intermediate spool 13 adapted to control flow through a port 11a which fluidly interconnects the suction line 15 leading to the evaporator with a fluid passage 16 leading to the suction side of the compressor. The valve member 10 also includes end spools 12 and 14 which provide pressure chambers 17 and 18 respectively at each end of the valve member, and a longitudinally extending passage 19 intersecting transverse passage 19a to fluidly interconnect pressure chamber 17 with the space between spools 13 and 14 for a purpose which will be clear from the following description.

The pilot valve assembly B comprises a valve head portion 20 engaging a seat formed in a passage 21 which interconnects passage 16 leading to the suction side of the compressor with a passage 22 communicating with pressure chamber 18. The pilot valve thus controls the flow of fluid from pressure chamber 18 to the suction side of the compressor via passages 22, 21, and 16. The valve head 20 is formed on the end of an elongated stem 23, said stem being connected to two flexible diaphragms 25 and 26. These two diaphragms 25 and 26 are arranged so that a closed chamber 27 is formed therebetween, said chamber being interconnected to the source of control vacuum through fluid passage 28. The opposite side of diaphragm 25 communicates with evaporator pressure through fluid passages 29 and 15 while the larger of the two diaphragms, 26, is exposed to atmospheric pressure on one side thereof through an opening 30.

The low pressure refrigerant gas from the evaporator enters the control device through passage 15, said passage corresponding to the suction gas line. This pressure is communicated to pressure chamber 17 through the passage 19 and 19a in the valve member, and is also communicated to one side of diaphragm 25 through fluid passage 29. It can be seen that when the pilot valve is closed, flow between passages 21 and 22 is throttled so that the pressure in pressure chamber 18 will become equal to the pressure within passage 15 and pressure chamber 17. The equalization of pressure between 15 and 18 is due to inherent leakage around spool 14. The spool areas on which pressure acts are made so that under the aforementioned conditions, there are no unbalanced forces acting on said valve member. Under these conditions, the spring 31 in pressure chamber 18 biases the valve member into its closed position so that spool 13 prevents direct flow through port 11a from the suction line 15 to the inlet side of the compressor.

If the operator desires to increase the cooling capacity of the system, the control vacuum is adapted to increase the pressure (decrease the vacuum) within the chamber 27. This action would cause the pilot valve to open permitting fluid to bleed from pressure chamber 18 behind the spool 14, through passages 21 and 22 to the suction side of the compressor via passage 16. The decrease in pressure in pressure chamber 19 creates an imbalance of forces on the valve member 10 which overcomes the force exerted by spring 31 to shift the valve member to the right as viewed in FIGURE 1, and would allow direct flow of refrigerant through port 11a between the suction line 15 and the inlet side of the compressor. As evaporator pressure decreases, the valve member will eventually reach an equilibrium position such that the leakage past the spool maintains a pressure within the chamber 20 so as to satisfy the cooling equipment.

Should the evaporator pressure decrease, thus indicating that less cooling capacity is required, the pressure on the left-hand side of the small diaphragm 25 would decrease relative to the side exposed to the vacuum chamber 28. This would cause the pilot valve to close to adjust the equilibrium position of the valve member. When the valve is in its equilibrium position, the leakage past the spool 14 is equal to the flow through the pilot valve.

Immediately before the valve member assumes its equilibrium position, the unbalancing forces on the valve member become less and less in magnitude so that the forces on both the pilot valve and the regulating valve reach this state of equilibrium with the evaporator pressure, i.e., the pressure in passages 15 and 30 being directly proportional to the magnitude of the remotely applied vacuum within chamber 28. The setting for the evaporator pressure is therefore controlled by the remotely applied vacuum only, and is independent of compressor speed or evaporator load conditions so long as the inherent capacity of the compressor is not exceeded.

Figure 2:
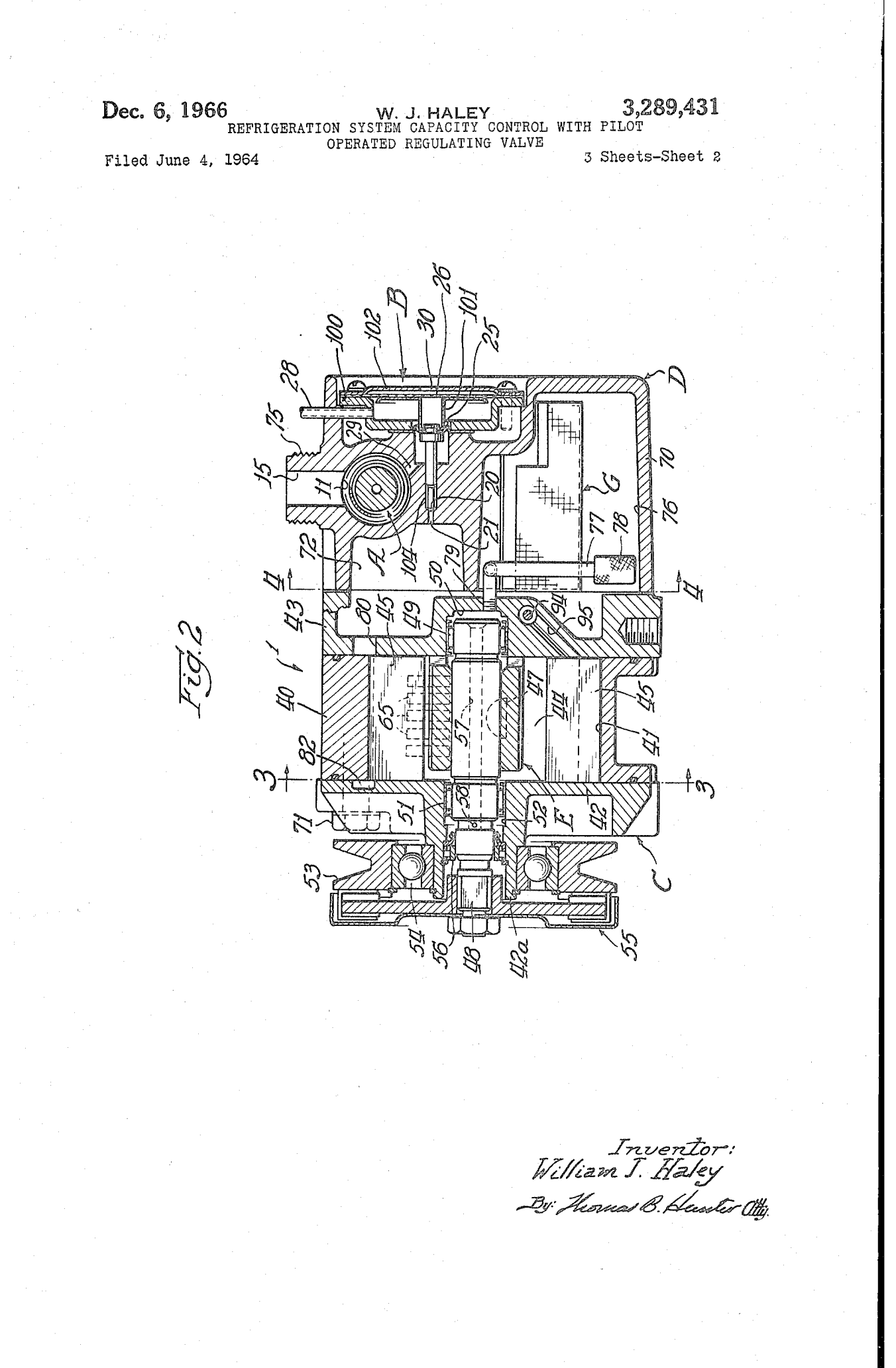

In FIGURES 2 to 5, a preferred compressor design which embodies the principles of the present invention is illustrated. Referring first to FIGURE 2, it will be noted that the compressor comprises a housing which is divided into a first section C and a second section D. For convenience, sections C and D will be referred to herein as the compressor section and the gas chamber section respectively.

Compressor section C includes a casing or body member 40 having a cylindrical bore 41 extending therethrough, a front bearing plate 42, a rear bearing plate 43, and a rotor assembly, designated generally by reference character E, the latter being received within the casing bore 41. The rotor assembly E includes a slotted rotor element 44 which carries a plurality of substantially radially extending and reciprocating vanes 45. The axis of rotor element 44 is offset or eccentrically arranged with respect to the axis of the bore 41 so that the bore, the front bearing plate 42, the rear bearing plate 43, and the rotor element 44 cooperate to provide a crescent-shaped compression chamber or cavity 46. Rotor element 44 is keyed at 47 to a drive shaft 48 which is journalled in an anti-friction bearing 49 supported by the rear bearing plate 43 in recessed portion 50 and an anti-friction bearing 51 supported within a counterbore 52 in the front bearing plate 42.

Inasmuch as the preferred embodiment is especially adapted for automotive use, the compressor rotor is driven by a V-belt pulley 53 rotatably journalled on a bearing 54, the inner race of which is carried on an axial extension 42a of the front bearing plate 42 and arranged for driving connection with the engine fan belt (not shown). Pulley 53 is connected to the rotor drive shaft 48 through a vibration dampener 55 of any suitable construction. The front bearing plate extension 42a is provided with a lip-type seal 56 engaging a boss on the drive shaft to prevent loss of refrigerant and lubricant through the front bearing plate journal bearing. The drive shaft 48 is further provided with an axially extending bore 57 intersecting a transverse bore 58. These two bores fluidly interconnect the recessed portion 50 in the rear bearing plate and the space between the seal and the front bearing to assist in balancing the rotor assembly and provide a flow path for lubricating oil.

Figure 3:
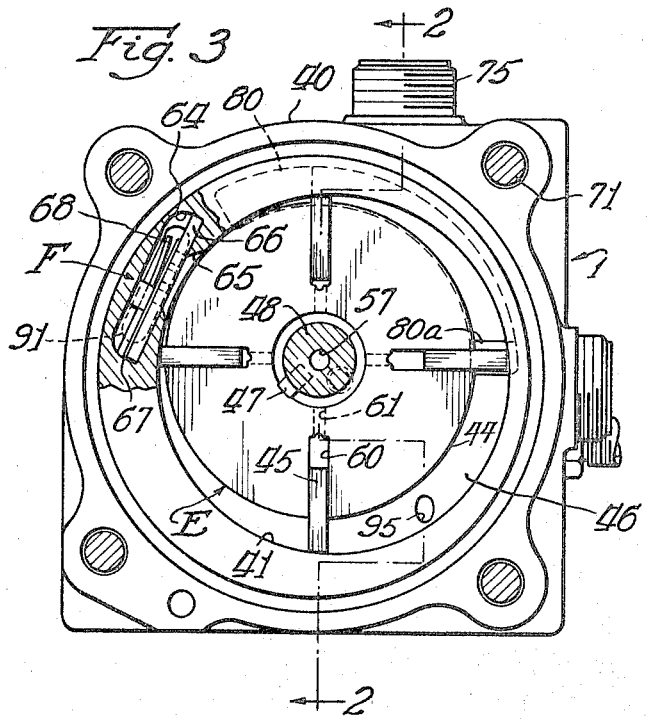
FIGURE 3 is a cross-sectional view taken along the plane of line 3—3 of FIGURE 2.

Attention is now directed to FIGURE 3 which is a cross-sectional view showing the details of the rotor assembly E and illustrating the manner in which the rotor assembly cooperates with the compression cavity. Rotor assembly E, as previously noted, includes a cylindrical rotor element 44 which is furnished with a plurality of radially extending slots 60, each of which are adapted to receive a vane member 45 reciprocatively slidable therein. The vane members, preferably fabricated from a graphite compound, are arranged so that their radially outermost or tip portions extend transversely across the compression cavity and are in constant engagement with the inside diameter of the bore 41. Oil for lubricating and sealing purposes is supplied to the space underneath each vane by means of grooves 61 cut in the back face of the rotor element 44. The oil pressure also serves to hold the vanes outwardly against the surface of the cavity.

As shown most clearly in FIGURE 3, the casing or body member 40 is provided with an elongated gas discharge passage 64 which is spaced radially outwardly from the internal surface of cylindrical bore 41 adjacent to the point where the rotor and casing bore are almost contiguous. Passage 64, extends the full length of casing 40 and communicates with a discharge gas compartment in the gas chamber section D in a manner which will be more fully described below. Fluid passage means to fluidly interconnect the compression cavity 46 and gas discharge passage 64 are provided in the form of a plurality of slots 65 through the thin partition separating passage 64 from the compression cavity 46.

A valve assembly, designated generally by reference character F is disposed within the gas discharge passage 64, said assembly including a perforated valve plate 66, a plurality of flexible, reed-type valve elements 67 normally overlying the perforations in the valve plate and a backing plate 68 which limits the upward (opening) movement of valve elements 67.

Figure 4:
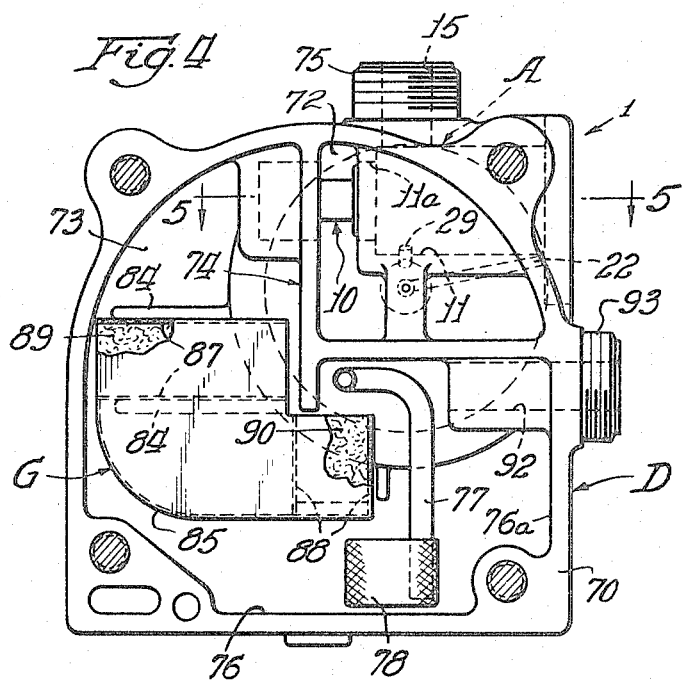
FIGURE 4 is a cross-sectional view taken along the plane of line 4—4 of FIGURE 2.

As best illustrated in FIGURES 2 to 4, the gas chamber section D comprises a casing 70, preferably in the form of an integral casting, which is connected to the compressor section C by means of a plurality of elongated cap screws 71 located around the periphery thereof. The cap screws extend through registered holes (not shown) in the front bearing plate 42, the casing 40, and the rear bearing plate 43 and are adapted to be threaded into a series of tapped holes (not shown) in the gas chamber casing 70. The volume enclosed by casing 70 is divided into an inlet compartment 72 and a discharge compartment 73 by an integral, L-shaped partition 74. The inlet compartment 72, located in the upper right-hand quadrant of the gas chamber (as seen in FIGURE 4), is in fluid communication with a gas inlet passage 15 to which the suction gas line is connected at nipple 75.

The gas discharge compartment 73 which is defined in part by partition 74 and in part by a portion of the casing 70 has a generally L-shaped configuration (FIGURE 4). The lower portion of the gas discharge compartment provides a sump 76 for the oil separated from the discharge gas, said oil being conducted back into the rotor assembly for lubrication and sealing. Means for this purpose include an oil return tube 77 having one end depending downwardly into the sump portion below the normal operating level of the oil therein and provided with a filter screen element 78. The other end of the oil return tube is received within a threaded aperture 79 in the bearing supporting recess 50 of rear bearing plate 43 and is consequently in communication with the rear bearing and also with the front bearing through the oil passages 57, 58 in the rotor shaft.

The inlet compartment 72 in the gas chamber section D is in fluid communication with the inlet portion of the compression cavity 18 through an arcuate inlet port 80 in the rear bearing plate 43 (see FIGURES 2 and 3). The front bearing plate (FIGURE 2) is also provided with an arcuate groove or slot 82 which is symmetrically arranged with respect to the inlet port in the front bearing plate. It can be seen from an inspection and a comparison of FIGURES 3 and 4 that the back side of inlet port 80 (i.e., the side facing the gas chamber section D) communicates solely with the inlet compartment 72 in the gas chamber. The inlet port 80 is provided with sharply chamfered end edges 80a so that the opening of said inlet port on the compression cavity side is of greater arcuate length (approximately 110° of arc) than the back side of the bearing plate 43 which communicates with the inlet compartment 72.

The compressor also includes oil separation means within the discharge compartment to effect a coalescing and separation of oil entrained in the discharge gas. It will be noted from FIGURE 4 that the gas chamber casing includes a pair of integral ribs 84 for supporting a generally L-shaped coalescing element designated at G. This element comprises a metal retainer or frame including a sheet metal member having a curved bottom portion 85 and an upstanding side wall. A pair of coalescing medium support member 87, 88 are brazed or otherwise secured to the curved, bottom portion 85 of said frame, said support members being formed of coarse-mesh wire screening. Each of the support members comprises a pair of spaced parallel panels which are adapted to receive the coalescing medium therebetween. Support member 87 is arranged horizontally across the path of the discharge gas while support member 88 is arranged vertically at substantially a right angle with respect to member 87.

The coalescing medium, in a preferred embodiment, comprises a pair of generally rectangular pads 89, 90 of woven metal fibers or equivalent material. One medium which has been found to be particularly suitable is woven copper filament of the type commonly employed in scouring pads or the like. It is obvious, however, that other materials may be used, the only requirements being that the density of the materials should be such that the pressure drop across each pad is not too large and that the material have a relatively large surface area to volume ratio.

A discharge port 91 is provided through the rear bearing plate, said discharge port providing fluid passage means between the discharge gas passage 64 in the compressor casing 40 and the discharge compartment 73 of the gas chamber section. This discharge port 91 registers with the discharge passage 64 (FIGURE 3) and terminates in the upper left-hand portion of the discharge compartment as viewed in FIGURE 4. The discharge gas is thus constrained to flow through the coalescing mediums 89, 90 before passing out through the outlet 92 which communicates with the hot gas line fastened at external nipple 93. The oil carried in the gas stream is thrown out of the path against wall portion 76a adjacent to the sump. A more detailed description of the oil separation construction and operation is found in co-pending application Serial No. 372,616 filed by L. E. Harlin on June 4, 1964, now Patent No. 3,258,198.

The compressor is further provided with means for injecting liquid refrigerant into the compression cavity 46 in response to the temperature of the discharge gas exiting the compression cavity through discharge port 91. Such means include a valve actuating element 94, movement of which is controlled by temperature responsive means located in the discharge gas stream (not shown). When the latter indicates that the compressor is running too hot, the valve element 94 operates a valve (not shown) to cause liquid refrigerant from an external line to pass into the compression cavity 46 through fluid passage means 95. The specific details of this system and the operation thereof form no part of the present application as such. This system is described with more particularity and claimed in co-pending application Serial No. 372,615 filed by H. J. Cassidy et al. on June 4, 1965, now U.S. Patent No. 3,250,460 issued on May 10, 1966.

As pointed out in the preliminary remarks, an important aspect of this invention concerns the capacity control system which is integrated into the compressor unit. In referring to the elements of the capacity control system, the same reference numerals will be used both with respect to the schematic representation of FIGURE 1 and to the components of the preferred embodiment illustrated in FIGURES 2 to 5.

Both the regulating valve A and the pilot valve B which make up the capacity control system are located within the gas chamber. The gas chamber casing 70 is provided with a cylindrical cavity 11 which receives the regulating valve A including slidable valve member 10. The intermediate portion of cavity 11 between spools 13 and 14 is directly underneath and in fluid communication with the inlet passage 15. As shown best in FIGURE 5, this area is also in fluid communication with pressure chamber 19 at the end of spool 12 through passages 19 and 19a in the valve member 10. Spool 13 cooperates with a spring loaded sealing means 98 to control flow from inlet 15 through port 11a into the inlet compartment 72 of the gas chamber.

The pilot valve assembly B comprises an annular retainer 100 which supports flexible diaphragms 25 and 26. The two diaphragms are connected together by means of a member 101 which is fastened at one end to diaphragm 26 and at the other end to diaphragm 25 and the stem portion 23 of the pilot valve. A cover plate 102 protects diaphragm 26 and is provided with an aperture 30 through which the one side of the diaphragm 26 is exposed to atmospheric pressure.

The area between spools 13 and 14 is fluidly connected to one side of diaphragm 25 through passage 29. Pressure chamber 18, defined between the end of spool 14 and a closure plate 103 (FIGURE 5), is connected to one side of the pilot valve through passage 22. The latter intersects the valve stem receiving cavity 104 adjacent the head portion 20 of said valve.

*Operation*

The setting for the evaporator pressure is controlled by remotely applied vacuum only and is therefore independent of compressor speed or evaporator load conditions so long as the inherent capacity of the compressor is not exceeded. If the operator desires maximum cooling, the vacuum applied to the chamber 27 between diaphragms 25 and 26 through line 28 is at a minimum. Under these conditions, the pressure on opposite sides of diaphragm 26 is substantially equal so that the evaporator pressure communicated through passages 15 and 29 urges diaphragm 26 and pilot valve 21 to the right as viewed in FIGURE 2. With the pilot valve open, fluid is permitted to flow from pressure chamber 18 through passages 22 and 21 to the inlet compartment. This causes an unbalance of forces acting on the valve element 10 which exceed the biasing force of spring member 31. These unbalanced forces cause the valve member 10 to shift to the right as viewed in FIGURE 5 unseating the sealing element and moving the spool 13 to the right to permit direct flow from the area between spools 13 and 14 through port 11a into the inlet compartment 72. The inlet compartment, of course, is in direct communication with the suction side of the compressor through inlet ports 80, 82. As the evaporator pressure increases, the pressure communicated to the one side of the diaphragm 25 decreases so as to tend to close the pilot valve. Eventually, an equilibrium position will be reached such that the leakage past the spool 14 is equal to the flow from the pilot valve.

When minimum cooling is called for, the maximum vacuum is supplied to the vacuum chamber 27 so that force on the large diaphragm 26 is sufficient to maintain the pilot valve closed at all times regardless of the evaporator pressure acting in opposition against the similar diaphragm 25. When the pilot valve is closed, the forces regulating the valve element 10 are such that the spring member 31 maintains the regulating valve in its closed position. It should be understood that the capacity control system could be arranged so that maximum control vacuum produces maximum cooling. This may be effected by simply applying the control vacuum to the opposite side of the large diaphragm 26 and biasing the pilot valve, by a spring or other such means, in a closed position.

By way of summary, the broadest concept of the invention is a system of the general character described comprising a compressor having a working space (provided by compression cavity 46), inlet and outlet ports communicating with said working space, means for compressing a fluid in said working space (rotor assembly E), valve means A for controlling the flow of fluid into said working space, a pilot valve B for controlling the setting of the valve means, and an operator for the pilot valve (diaphragms 25 and 26) which is movable in response to changes in a variable pressure condition (evaporator pressure, for example), and a control pressure. While this invention has been described in connection with a certain specific embodiment thereof, it is to be understood that this is by way of illustration and not by way of limitation; and the scope of this invention is defined solely by the appended claims which should be construed as broadly as the prior art will permit.

What is claimed is:

1. In an automotive air conditioning system including a compressor, an evaporator, and condenser connected in a closed circuit, said compressor being driven by an internal combustion engine having an intake manifold, a capacity control system including a valve between said evaporator and said compressor for controlling the flow of suction gas to said compressor; means for adjusting the setting of said valve including an operator which is responsive both to evaporator pressure and an adjustable control pressure; conduit means connecting said engine intake manifold to said operator to supply said control pressure and an adjustable constant pressure regulating valve.

2. Apparatus of the character described comprising a compressor having suction and discharge ports; a casing connected to said compressor, said casing having an inlet gas compartment communicating with said suction port, and a discharge gas compartment adapted to be fluidly conected to a condenser and communicating with said discharge port, said casing further including a cavity having an inlet port adapted to be fluidly connected to an evaporator and an outlet port opening into said inlet gas compartment; a valve member slidably received within said cavity including a first spool adapted to control the flow of suction gas into said inlet compartment and a second spool defining, with said cavity, a pressure chamber at one end of said valve member; fluid passage means for interconnecting said pressure chamber to said outlet port such that flow through said fluid passage causes movement of said valve member; pilot valve means in said fluid passage arranged to control the flow of fluid from said pressure chamber to said outlet port; and an operator for said pilot valve means including means responsive both to suction gas pressure and to an adjustable control pressure.

3. Apparatus as defined in claim 2 wherein said operator comprises a pair of spaced diaphragms defining a closed chamber, means connecting said diaphragms to said pilot valve means, means for interconnecting said closed chamber to an adjustable vacuum source, means for applying evaporator pressure to the opposite side of one of said diaphragms and means for applying a constant pressure to the opposite side of the other of said diaphragms.

4. In a compressor capacity control system, a valve adapted to be connected on the suction side of said compressor, said valve comprising a valve body having a cavity therein, fluid inlet and outlet ports intersecting said cavity; a valve member slidable in said cavity, said valve member having a plurality of spools thereon including a valving spool arranged to control the flow of fluid from said inlet port to said outlet port and end spools at opposite ends of said valve element defining together with said cavity, first and second pressure chambers; fluid passage means for equalizing the pressure between said outlet port and said first pressure chamber; means providing for a leakage flow path from said inlet port to said second pressure chamber around the end spool associated with said second pressure chamber; additional fluid passage means connecting said second pressure chamber to said outlet port, the position of said valve member being a function of the flow through said additional passage means; a pilot valve in said additional fluid passage means; and operator means for controlling the position of said pilot valve.

References Cited by the Examiner
UNITED STATES PATENTS

| | | | |
|---|---|---|---|
| 2,964,924 | 12/1960 | Dodge | 62—217 X |
| 2,966,044 | 12/1960 | Mitchell | 62—217 |
| 2,993,348 | 7/1961 | Boyle | 62—217 |

MEYER PERLIN, *Primary Examiner.*